3,135,698
ALKALI METAL SOAPS OF ROSIN AND ROSIN-FATTY ACID MIXTURES
Charles M. Lambert, New London, Pa., assignor to Hercules Powder Company, Wilmington, Del., a corporation of Delaware
No Drawing. Filed June 23, 1960, Ser. No. 38,109
5 Claims. (Cl. 252—368)

This invention relates to alkali metal soaps of disproportionated rosin and disproportionated rosin-fatty acid mixtures having improved stability against crystallization and to a method of preparing same.

In recent years, efforts to improve the physical properties of the sodium and potassium soaps of disproportionated rosin for use as emulsifiers in the synthetic rubber industry have moved consistently in the direction of higher solids and higher acid number soaps. This has increased the tendency of such soaps toward crystallization. In addition, the disproportionated rosin on which these soaps are based is being produced at gradually increasing acid numbers, and concurrently, with higher dehydroabietic acid content. These properties in the resin further enhance the possibility of crystallization in a given soap.

Since crystallization of these soaps is a serious disadvantage, attempts have been made to prevent it as by formaldehyde treatment, addition of dimer acids and the like. While these have given satisfactory inhibition against crystallization, they are subject to the disadvantage that when used in emulsion polymerization processes for the manufacture of synthetic rubber, they retard the rate of polymerization.

A principal object of the present invention, therefore, is to inhibit crystallization in alkali metal soaps of disproportionated rosin and disproportionated rosin-fatty acid mixtures without impairing their efficiency as emulsifiers in emulsion polymerization processes.

It has now been found that crystallization is strikingly inhibited in alkali metal soaps of disproportionated rosin and disproportionated rosin-fatty acid mixtures by the inclusion therein of from about 5% to 20% by weight, based on the weight of disproportionated rosin, of tetrahydro rosin acids, such as tetrahydroabietic and tetrahydropimaric, which have been neutralized, at least partially, with alkali. The tetrahydro rosin acids may be added as such but are preferably added in the form of a mixture as contained, for example, in substantially completely hydrogenated rosin. Soaps so treated are resistant to crystallization over relatively long periods of time. Moreover, this improvement in crystallization inhibition is obtained without impairing emulsifier efficiency in the polymerization process.

Having described the invention generally, the following examples are given to illustrate specific embodiments thereof. Parts are by weight unless otherwise specified.

EXAMPLE 1

Two hundred eighty-nine parts of a disproportionated wood rosin containing less than 0.5% abietic type acids and about 50% dehydroabietic acid was reacted with 49 parts of 50% sodium hydroxide and additional water. The sodium soap of disproportionated rosin thus formed, after being seeded with crystals, was grossly crystalline after six weeks at 60° C.

A similar soap, in which 10% of the disproportionated rosin was replaced with a completely hydrogenated wood rosin containing less than 1.0% dehydroabietic acid and 91% tetrahydro rosin acids (including tetrahydroabietic and tetrahydropimaric acids), was completely free of crystals after six weeks at 60° C. The determined properties of the two soaps are set forth in Table 1 below.

Table 1

| | Sodium soap of disproportionated rosin | Sodium soap of 90% disproportionated rosin, 10% completely hydrogenated rosin |
|---|---|---|
| Total solids | 75.5% | 75.4%. |
| Acid number | 25.3 | 26.9. |
| Crystalline content after six weeks at 60° C. | Grossly crystalline | No crystals (microscopic examination). |
| Polymerization rate (as hours to 60% conversion). | 6.7 | 6.3. |

EXAMPLE 2

Two hundred ninety-two parts of a disproportionated wood rosin containing less than 0.5% abietic acid and about 50% dehydroabietic acid was reacted with 91.5 parts of 45% potassium hydroxide and additional water. The potassium soap of disproportionated rosin thus formed, after being seeded with crystals, was grossly crystalline within three weeks at 60° C.

A similar soap, in which 15% of the disproportionated rosin was replaced with a substantially completely hydrogenated rosin, contained no crystals after six weeks' storage at 60° C. The determined properties of the two soaps are set forth in Table 2 below.

Table 2

| | Potassium soap of disproportionated rosin | Potassium soap of 85% disproportionated rosin, 15% substantially completely hydrogenated rosin |
|---|---|---|
| Total solids | 80.8% | 80.9%. |
| Acid number | 18.9 | 18.0. |
| Crystalline content at 60° C. | Grossly crystalline (3 weeks). | No crystals in 6 weeks (microscopic examination). |

EXAMPLE 3

A potassium soap of mixed fatty and rosin acids, in the approximate ratio of 1.2:1, was prepared in the following manner. One hundred ten parts of disproportionated rosin, similar to that utilized in Example 1, and 113 parts of hydrogenated tallow fatty acids were reacted with 73 parts of 45.5% potassium hydroxide and additional water. The product, after being seeded with crystals, was grossly crystalline after six weeks at 60° C. The term "grossly crystalline," as used herein, denotes that the soap, normally fluid at 140° F., was crystallized to such an extent that all flow properties were lost at 140° F.

A similar soap in which 10% of the disproportionated rosin requirement was replaced with a substantially completely hydrogenated rosin, similar to that used in Example 1, contained only a microscopic trace of crystals after similar seeding, storage at 60° C., and observation for six weeks. The determined properties of the two soaps of mixed organic acids are set forth in Table 3 below.

Table 3

| | Potassium soap of disproportionated rosin-fatty acid mixture | Potassium soap of disproportionated rosin, substantially completely hydrogenated rosin, and fatty acid |
|---|---|---|
| Total solids | 82.1% | 81.3%. |
| Acid number | 23.4 | 23.2. |
| Crystalline content after six weeks at 60° C. | Grossly crystalline | Trace of crystals. |

EXAMPLE 4

A potassium soap of mixed fatty and rosin acids, in the approximate ratio of 1.2:1, was prepared in the following manner. Disproportionated rosin (110 parts) and 113 parts of hydrogenated tallow fatty acids were reacted with 73 parts of 45.5% potassium hydroxide and additional water. The resulting soap, after being seeded with crystals, was grossly crystalline after five weeks at 60° C.

A similar soap was prepared in which 5% of the disproportionated rosin requirement was replaced with a substantially completely hydrogenated rosin, similar to that used in Example 1. A portion of this soap was seeded in a similar manner, and after six weeks at 60° C. contained a moderate amount of crystals when observed microscopically. However, its flow properties at 140° F. were not affected.

A third similar soap was prepared in which 10% of the disproportionated rosin requirement was replaced with a substantially completely hydrogenated rosin. After similar seeding, storage at 60° C., and observation for six weeks, this soap contained only a microscopic trace of crystals.

The properties of these three soaps, as determined analytically, were as follows:

Table 4

|  | Potassium soap of disproportionated-rosin-fatty acid mixture | Potassium soap of (95%) disproportionated rosin, (5%) tetrahydro rosin acids, and fatty acid | Potassium soap of (90%) disproportionated rosin, (10%) tetrahydro rosin acids, and fatty acid |
|---|---|---|---|
| Total solids | 82.2% | 81.4% | 81.7%. |
| Acid number | 23.5 | 23.0 | 24.1. |
| Crystalline content, six weeks at 60° C. | Grossly crystalline. | Mod. crystal growth. | Trace of crystals. |

The rosin soaps of the invention are thus the alkali metal and particularly the sodium and potassium soaps of disproportionated rosin and disproportionated rosin-fatty acid mixtures containing from about 5% to about 20% by weight, based on the weight of disproportionated rosin, of tetrahydro rosin acids or sufficient substantially completely hydrogenated rosin to supply the indicated amount of tetrahydro rosin acids. The term "substantially completely hydrogenated rosin," as used herein, denotes a hydrogenated rosin which has absorbed at least 1.22% hydrogen on the basis of the unhydrogenated rosin. These products may be prepared from any suitable type of rosin material such as gum rosin, wood rosin, tall oil rosin or the like and by any suitable methods such as those disclosed, for example, in U.S. 2,346,793 and U.S. 2,776,276. A typical analysis of a "substantially completely hydrogenated rosin" of the type contemplated for use herein is as follows:

| | |
|---|---|
| Tetrahydroabietic acid | percent__ 68 |
| Tetrahydropimaric acid | do____ 23 |
| Dehydroabietic acid | do____ 0.5 |
| Acid number | 160 |

The disproportionated rosin contemplated for use herein in preparing the soaps of the invention will generally contain less than 0.5% abietic acid and from about 40% to about 60% dehydroabietic acid, the remainder being mostly dihydro resin acids and a small amount of neutral materials. It may be prepared from any suitable rosin material including gum rosin, wood rosin and tall oil rosin and in any suitable manner as by a heat treatment in the presence of a catalyst such as iodine, sulfur dioxide, platinum and the like. A suitable method for effecting disproportionation of rosin and rosin-fatty acid mixtures is disclosed in U.S. 2,138,183 to Edwin R. Littmann.

The soaps of the invention may also be prepared from disproportionated rosin-fatty acid mixtures. Mixtures of this type suitable for use herein may be obtained by a disproportionation treatment, i.e., a heat-treatment in the presence of a suitable catalyst such as iodine, sulfur, sulfur dioxide, platinum, palladium or the like, of a rosin-fatty acid mixture derived from tall oil. Suitable mixtures may also be obtained by mixing disproportionated rosin with other fatty acid mixtures such as acids contained in tallow or partially hydrogenated tallow.

The proportion of fatty acids in the mixture may vary widely but will usually be from about 50% to about 60% of the mixture. The fatty acids may, if desired, be hydrogenated or otherwsie treated to render them more suitable for the purpose.

In the preparation of the soaps of the invention the tetrahydro rosin acids, as such, or as found is substantially completely hydrogenated rosin, may be added to the disproportionated rosin and the mixture then heated with aqueous alkali to form the soaps in the usual manner. Alternatively, the tetrahydro rosin acids or substantially completely hydrogenated rosin, neutralized at least partially with alkali, may be added to the previously formed soap of disproportionated rosin or disproportionated rosin-fatty acid mixtures.

The degree of saponification of the soaps of the invention may vary widely. In general, however, the degree of saponification will vary from about 30% to about 95% and preferably from about 80% to about 95%.

The amount of tetrahydro rosin acids or substantially completely hydrogenated rosin required for effective inhibition against crystallization will vary depending upon the acid number of the rosin and the acid number and solids content of the soap. In most cases it will be found that from about 6.5% to about 10% of tetrahydro rosin acids or an equivalent amount of substantially completely hydrogenated rosin, by weight based on the weight of disproportionated rosin, will be ample for the purpose. However, amounts up to about 20% may be used in some cases. In general, amounts less than 5% will not provide the desired inhibition against crystallization.

It will thus be seen that the present invention provides alkali metal soaps of disproportionated rosin and disproportionated rosin-fatty acid mixtures having improved resistances to crystallization.

Moreover, such soaps, when used in aqueous emulsion polymerization processes, give as good a rate of polymerization, and, in some cases, a better rate of polymerization, than soaps to which the crystallization inhibitor has not been added.

What I claim and desire to protect by Letters Patent is:

1. A rosin soap adapted for use as an emulsifier in aqueous emulsion polymerization processes, said soap being selected from the group consisting of sodium and potassium soaps of disproportionated rosin and mixtures of disproportionated rosin with fatty acids selected from the group consisting of tall oil fatty acids, hydrogenated tall oil fatty acids, tallow fatty acids, and hydrogenated tallow fatty acids, said soap being stabilized against crystallization by having incorporated therein from about 5% to about 20% by weight, based on the weight of disproportionated rosin, of tetrahydro rosin acids, said tetrahydro rosin acids being neutralized to the extent of from about 30% to about 95% with a material selected from the group consisting of sodium and potassium hydroxides and carbonates.

2. A soap adapted for use as an emulsifier in aqueous emulsion polymerization processes, said soap being selected from the group consisting of sodium and potassium soaps of mixtures of disproportionated rosin with fatty acids selected from the group consisting of tall oil fatty acids, hydrogenated tall oil fatty acids, tallow fatty acids, and hydrogenated tallow fatty acids, said soap being stabilized against crystallization by having incorporated therein from about 5% to about 20% by weight, based on the weight of rosin, of tetrahydro rosin acids, said tetrahydro rosin acids being neutralized to the extent of from about 30% to about 95% with a material selected from the group consisting of sodium and potassium hydroxides and carbonates.

3. A rosin soap adapted for use as an emulsifier in aqueous emulsion polymerization processes, said soap being selected from the group consisting of sodium and potassium soaps of disproportionated rosin, said soap being stabilized against crystallization by having incorporated theren from about 5% to about 20% by weight, based on the weight of disproportionated rosin, of tetrahydro rosin acids, said tetrahydro rosin acids being neutralized to the extent of from about 30% to about 95% with a material selected from the group consisting of sodium and potassium hydroxides and carbonates.

4. A rosin soap adapted for use as an emulsifier in aqueous emulsion polymerization processes, said soap being selected from the group consisting of sodium and potassium soaps of disproportionated rosin, said soap being stabilized against crystallization by having incorporated theren a sufficient amount of partially neutralized substantially completely hydrogenated rosin to provide from about 5% to about 20% by weight, based on the weight of disproportionated rosin, of tetrahydro rosin acids, said tetrahydro rosin acids being neutralized to the extent of from about 30% to about 95% with a material selected from the group consisting of sodium and potassium hydroxides and carbonates.

5. A rosin soap adapted for use as an emulsifier in aqueous emulsion polymerization processes, said soap being selected from the group consisting of sodium and potassium soaps of mixtures of disproportionated rosin with fatty acids selected from the group consisting of tall oil fatty acids, hydrogenated tall oil fatty acids, tallow fatty acids, and hydrogenated tallow fatty acids, said soap being stabilized against crystallization by having incorporated therein a sufficient amount of partially neutralized substantially completely hydrogenated rosin to provide from about 5% to about 20% by weight, based on the weight of disproportionated rosin, of tetrahydro rosin acids, said tetrahydro rosin acids being neutralized to the extent of from about 30% to about 95% with a material selected from the group consisting of sodium and potassium hydroxides and carbonates.

References Cited in the file of this patent

UNITED STATES PATENTS

| | | |
|---|---|---|
| 2,138,183 | Littmann | Nov. 29, 1938 |
| 2,249,766 | Humphrey | July 22, 1941 |
| 2,285,333 | Humphrey | June 2, 1942 |
| 2,346,793 | Schultz et al. | Apr. 18, 1944 |
| 2,682,528 | Vandenberg | June 29, 1954 |
| 2,776,276 | Glasebrook et al. | Jan. 1, 1957 |